(12) United States Patent
Mohri et al.

(10) Patent No.: US 10,995,019 B2
(45) Date of Patent: May 4, 2021

(54) HEATING APPARATUS AND WATER ELECTROLYSIS SYSTEM

(71) Applicant: HONDA MOTOR CO., LTD., Tokyo (JP)

(72) Inventors: Masahiro Mohri, Wako (JP); Daisuke Misu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 16/229,000

(22) Filed: Dec. 21, 2018

(65) Prior Publication Data

US 2019/0194042 A1 Jun. 27, 2019

(30) Foreign Application Priority Data

Dec. 25, 2017 (JP) .............................. JP2017-247758

(51) Int. Cl.
*C25B 1/04* (2021.01)
*C02F 1/02* (2006.01)
(Continued)

(52) U.S. Cl.
CPC ............ *C02F 1/46114* (2013.01); *C02F 1/02* (2013.01); *C02F 1/4676* (2013.01); *C25B 1/04* (2013.01);
(Continued)

(58) Field of Classification Search
CPC .......... F28D 21/0008; F28D 9/00; F28D 7/00; F24H 3/0405; F24H 3/065; F24H 4/02; F24H 9/1872; F24H 6/00; F24H 9/2071; F24H 3/0488; F24H 3/0429; F24H 3/087; F24H 9/1863; F24H 3/0411; F24H 3/0417; F24H 3/002; F24H 4/04; F24H 9/0063; F24H 9/02; F24H 3/0435; F24H 9/2085; F24H 9/2007; F24H 8/00; F24H 1/009; F24H 2250/04; F24H 3/085; F24H 3/006; F24H 9/0005; F24H 9/0052; F24H 3/105; F24H 1/121; F24H 3/02; F24H 9/2064;
(Continued)

(56) References Cited

U.S. PATENT DOCUMENTS

2011/0240486 A1 10/2011 Yoshida et al.

FOREIGN PATENT DOCUMENTS

| JP | 2005-243470 | 9/2005 |
| JP | 2010-086916 | 4/2010 |

(Continued)

OTHER PUBLICATIONS

Japanese Office Action for Japanese Patent Application No. 2017-247758 dated May 21, 2019.

*Primary Examiner* — Salil Jain
(74) *Attorney, Agent, or Firm* — Amin, Turocy & Watson, LLP

(57) ABSTRACT

A heating apparatus of a water electrolysis system includes: an enclosure with a draw-in hole; a heating unit accommodated in the enclosure; a blowing unit for directing outside air to the heating unit; a circulation channel for directing part of air heated by the heating unit to a space between the heating unit and the blowing unit; and a draw-out portion for leading the air heated by the heating unit to the outside. The air in the circulation channel is introduced to a space between the heating unit and the blowing unit due to the Venturi effect.

13 Claims, 4 Drawing Sheets

(51) Int. Cl.
*C02F 1/461* (2006.01)
*C25B 15/08* (2006.01)
*C02F 1/467* (2006.01)
*C25B 9/70* (2021.01)
*C25B 11/00* (2021.01)

(52) U.S. Cl.
CPC ............... *C25B 9/70* (2021.01); *C25B 11/00* (2013.01); *C25B 15/08* (2013.01); *C02F 2201/46125* (2013.01); *C02F 2201/46155* (2013.01)

(58) Field of Classification Search
CPC . F24H 3/04; F24H 9/06; F24H 9/1881; F24H 9/0073; F24H 2250/02; F24H 9/2035; F24H 3/00; F24H 3/06; F24H 9/1818; F24H 1/205; F24H 3/022; F24H 3/025; F24H 3/0476; F24H 9/0068; F24H 9/20; F24H 3/08; F24H 3/0423; F24H 9/0015; F24H 1/142; F24H 3/0441; F24H 3/0447; F24H 7/0416; F24H 4/06; F24H 3/062; F24H 1/102; F24H 3/067; F24H 3/12; F24H 3/081; F24H 9/1836; F24H 9/1809; F24H 9/14; F24H 9/2078; F24H 3/0464; F24H 9/1827; F24H 3/088; F24H 3/0452; F24H 2240/00; F24H 3/008; F24H 2230/00; F24H 9/2021; F24H 9/2014; F24H 9/0084; F24H 9/2028; F24H 3/0458; F24H 9/0042; F24H 9/2092; F24H 1/22; F24H 8/006; F24H 9/00; F24H 2240/10; F24H 1/43; F24H 1/00; F24H 1/06; F24H 1/107; F24H 8/003; F24H 1/202; F24H 9/146; F24H 9/18; F24H 1/40; F24H 2240/09; F24H 2250/08; F24H 3/004; F24H 7/02; F24H 7/0216; F24H 1/0027; F24H 1/101; F24H 9/0057; F24H 9/189; F24H 1/103; F24H 2240/08; F24H 4/00; F24H 9/0021; F24H 9/0026; F24H 3/102; F24H 3/047; F24H 3/0482; F24H 2240/06; F24H 9/1854; F24H 1/20; F24H 1/208; F24H 1/28; F24H 1/287; F24H 7/0433; F24H 1/403; F24H 3/027; F24H 1/10; F24H 1/18; F24H 2203/00; F24H 1/0045; F24H 1/08; F24H 2250/00; F24H 3/082; F24H 7/002; F24H 9/0089; F24H 1/185; F24H 1/263; F24H 9/0036; F24H 1/145; F24H 1/186; F24H 1/201; F24H 1/445; F24H 7/04; F24H 1/26; F24H 1/36; F24H 2250/06; F24H 9/12; F24H 9/16; F24H 1/122; F24H 1/165; F24H 1/52; F24H 2240/01; F24H 7/0208; F24H 9/0031; F24H 9/0094; F24H 9/148; F24H 1/285; F24H 1/34; F24H 9/142; F24H 9/205; F24H 1/182; F24H 1/225; F24H 2240/02; F24H 7/0425; F24H 1/162; F24H 1/38; F24H 1/44; F24H 1/48; F24H 9/0078; F24H 9/144; F24H 9/1845; F24H 1/124; F24H 3/107; F24H 9/124; F24H 1/0036; F24H 1/0081; F24H 1/41; F24H 9/2042; F24H 1/0018; F24H 1/106; F24H 1/181; F24H 2250/12; F24H 2250/14; F24H 7/00; F24H 7/0233; F24H 9/2057; F24H 1/206; F24H 2210/00; F24H 2240/04; F24H 3/10; F24H 1/188; F24H 1/24; F24H 2240/122; F24H 7/0458; F24H 9/122; F24D 3/18; F24D 17/02; F24D 2200/12; F24D 5/00; F24D 19/1084; F24D 5/02; F24D 15/04; F24D 5/04; F24D 2200/123; F24D 5/12; F24D 2200/14; F24D 12/02; F24D 5/10; F24D 2200/22; F24D 2200/08; F24D 3/08; F24D 11/0214; F24D 2200/04; F24D 19/1039; F24D 11/007; F24D 11/0221; F24D 5/005; F24D 19/06; F24D 19/1054; F24D 19/1087; F24D 2200/18; F24D 2220/042; F24D 19/1006; F24D 19/1015; F24D 13/02; F24D 19/1009; F24D 19/00; F24D 19/0087; F24D 19/1096; F24D 3/10; F24D 3/14; F24D 19/10; F24D 15/02; F24D 2200/11; F24D 17/0005; F24D 19/0082; F24D 15/00; F24D 13/00; F24D 11/02; F24D 13/04; F24D 11/006; F24D 3/00; F24D 2200/31; F24D 3/1066; F24D 3/12; F24D 11/003; F24D 11/0242; F24D 3/02; F24D 11/0264; F24D 9/00; F24D 17/0031; F24D 17/001; F24D 19/1072; F24D 11/002; F24D 2200/16; F24D 5/08; F24D 11/0285; F24D 19/083; F24D 2200/24; F24D 17/0021; F24D 11/009; F24D 11/00; F24D 2200/32; F24D 11/0257; F24D 3/145; F24D 2220/046; F24D 19/04; F24D 2200/26; F24D 3/165; F24D 19/0092; F24D 19/109; F24D 19/0085; F24D 2220/10; F24D 3/142; F24D 10/00; F24D 19/1045; F24D 2200/126; F24D 19/0097; F24D 3/005; F24D 19/1066; F24D 2220/0292; F24D 11/0235; F24D 19/0095; F24D 19/1018; F24D 19/1012; F24D 2220/0235; F24D 17/0052; F24D 2220/02; F24D 19/1048; F24D 2220/0207; F24D 7/00; F24D 2220/06; F24D 3/1041; F24D 19/065; F24D 19/067; F24D 19/081; F24D 2200/06; F24D 11/0228; F24D 2200/10; F24D 2200/20; F24D 2220/0271; F24D 13/024; F24D 19/1093; F24D 2200/02; F24D 2220/08; F24D 13/022; F24D 17/0078; F24D 11/005; F24D 19/087; F24D 3/148; F24D 11/0271; F24D 2200/30; F24D 3/1008; F24D 17/0026; F24D 19/086; F24D 5/06; F24D 17/00; F24D 19/062; F24D 19/08; F24D 2220/044; F24D 3/1058; F24D 3/16; F24D 19/106; F24D 19/1078; F24D 11/0278; F24D 19/1033; F24D 2220/2018; F24D 2220/2081; F24D 3/04; F24D 19/1042; F24D 17/0047; F24D 17/0068; F24D 17/0089; F24D 19/02; F24D 19/1024; F24D 19/1051; F24D 19/088; F24D 2200/043; F24D 2220/07; F24D 3/122; F24D 3/147; F24D 1/00; F24D 12/00; F24D 13/026; F24D 3/082; F24D 3/087; F24D 19/0002; F24D 3/1091; F24D 3/141; F24D 11/004; F24D 2220/006; F24D 11/008; F24D 17/0015; F24D 19/085; F24D 19/1057; F24D 2220/0257; F24D 3/1083; F24D 3/149; F24D 1/08; F24D 17/0036; F24D 2220/048; F24D 2220/2036; F24D 2220/2063; F24D 3/125; F24D 3/146;

F24D 10/003; F24D 11/001; F24D 19/008; F24D 19/0216; F24D 19/1063; F24D 19/1075; F24D 2200/115; F24D 2220/025; F24D 2220/0285; F24D 2220/209; H05B 2203/02; H05B 2203/023; H05B 3/50; H05B 3/16; H05B 1/0236; H05B 3/06; H05B 2203/022; H05B 3/14; H05B 2203/013; H05B 3/141; H05B 6/108; H05B 2203/014; H05B 3/24; H05B 2203/017; H05B 3/00; H05B 3/42; H05B 2203/021; H05B 3/02; H05B 3/20; H05B 3/26; H05B 3/22; H05B 3/46; H05B 2214/02; H05B 3/44; H05B 3/12; H05B 3/10; H05B 3/145; H05B 3/04; H05B 6/06; H05B 3/146; H05B 3/32; H05B 6/6473; H05B 3/34; H05B 3/40; H05B 6/642; H05B 3/58; H05B 6/109; H05B 6/1263; H05B 1/028; H05B 1/0202; H05B 2203/003; H05B 2214/04; H05B 3/265; H05B 2203/024; H05B 3/03; H05B 3/56; H05B 6/6476; H05B 2203/032; H05B 2203/016; H05B 1/00; H05B 1/02; H05B 3/0014; H05B 3/48; H05B 3/84; H05B 1/0244; H05B 2203/019; H05B 3/565; H05B 2203/011; H05B 3/008; H05B 6/645; H05B 2203/002; H05B 3/18; H05B 6/6485; H05B 2203/029; H05B 3/342; H05B 3/36; H05B 6/6482; H05B 6/80; H05B 3/0004; H05B 3/60; H05B 3/283; H05B 6/365; H05B 6/42; H05B 6/802; H05B 2203/005; H05B 2203/037; H05B 3/262; H05B 6/02; H05B 6/36; H05B 6/50; H05B 6/6426; H05B 2203/009; H05B 6/6408; H05B 2203/035; H05B 1/0272; H05B 3/0047; H05B 3/286; H05B 3/64; H05B 3/68; H05B 6/101; H05B 2203/026; H05B 3/0033; H05B 3/148; H05B 3/347; H05B 3/78; H05B 3/82; H05B 6/6435; H05B 1/0275; H05B 3/0052; H05B 47/105; H05B 6/10; H05B 6/105; H05B 6/64; H05B 6/6411; H05B 1/0205; H05B 1/0277; H05B 6/12; H05B 6/808; H05B 1/0208; H05B 1/0252; H05B 3/0085; H05B 3/08; H05B 3/28; H05B 3/80; H05B 45/00; H05B 6/6429; H05B 6/6479; F28C 1/14; F28C 1/00; F28C 3/06; F28C 1/16; F28C 3/08; F28C 1/02; F28C 2001/145; F28C 2001/006; F28C 1/04; F28C 3/14; F28C 3/02; F28C 3/12

See application file for complete search history.

(56) References Cited

FOREIGN PATENT DOCUMENTS

| JP | 2010086916 | A | * | 4/2010 | |
|---|---|---|---|---|---|
| JP | 2011-225964 | | | 11/2011 | |
| JP | 2015113496 | A | * | 6/2015 | |
| KR | 100774472 | B1 | * | 11/2007 | ........ H01M 8/04007 |

* cited by examiner

HEATING APPARATUS AND WATER ELECTROLYSIS SYSTEM

CROSS-REFERENCE TO RELATED APPLICATION

This application is based upon and claims the benefit of priority from Japanese Patent Application No. 2017-247758 filed on Dec. 25, 2017, the contents of which are incorporated herein by reference.

BACKGROUND OF THE INVENTION

Field of the Invention

The present invention relates to a heating apparatus for heating outside air and a water electrolysis system.

Description of the Related Art

Japanese Laid-Open Patent Publication No. 2011-225964 discloses a water electrolysis system in which a water electrolysis device for producing high-pressure hydrogen by electrolysis of pure water is accommodated in a casing and the inside of the casing is ventilated by a blowing unit.

SUMMARY OF THE INVENTION

When a water electrolysis system is installed in a geographically low-temperature region (a cold region) where the temperature drops below the freezing point, it is necessary to heat the outside air to be taken into the casing with a heating apparatus for prevention of freezing and the like of a water electrolysis stack and various accessories.

However, when the air velocity of air passing through the heating apparatus is lowered in order to reliably heat outside air, the inside of the casing cannot be efficiently ventilated. On the other hand, when the air velocity of air passing through the heating apparatus is increased in order to reliably ventilate the inside of the casing, air cannot be efficiently heated by the heating apparatus. Trying to enhance the heating ability of the heating apparatus for heating air without reducing the air velocity of the air passing through the heating apparatus gives rise to a problem of an increase in power consumption or an increase in the size of the apparatus.

The present invention has been made in view of these challenges and an object thereof is to provide a heating apparatus and a water electrolysis system that can reliably heat air with a required air velocity secured, while an increase in power consumption and apparatus size is avoided.

An aspect of the present invention is a heating apparatus including: an enclosure with a draw-in hole; a heating unit accommodated in the enclosure and heating outside air introduced into the enclosure from the draw-in hole; a blowing unit for directing outside air to the heating unit; a circulation channel for directing part of air heated by the heating unit to a space between the heating unit and the blowing unit; and a draw-out portion for leading the air heated by the heating unit to outside. Air in the circulation channel is introduced to a space between the heating unit and the blowing unit due to Venturi effect.

Another aspect of the present invention is a water electrolysis system including: a water electrolysis device that produces hydrogen by electrolysis of water; the heating apparatus set forth above; and a casing accommodating the water electrolysis device and the heating apparatus. The water electrolysis device is positioned in the casing such that air heated by the heating apparatus is directed to the water electrolysis device.

With the present invention, outside air blown from the blowing unit to the heating unit is heated by the heating unit, after which it flows down the circulation channel to be introduced to a space between the heating unit and the blowing unit due to the Venturi effect and reheated by the heating unit. Thus, outside air can be reliably heated with a required air velocity secured, while an increase in the power consumption of the heating apparatus and in its size can be avoided.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A heating apparatus and a water electrolysis system according to the present invention are described below by showing a preferred embodiment with reference to the accompanying drawings.

Figure 1:
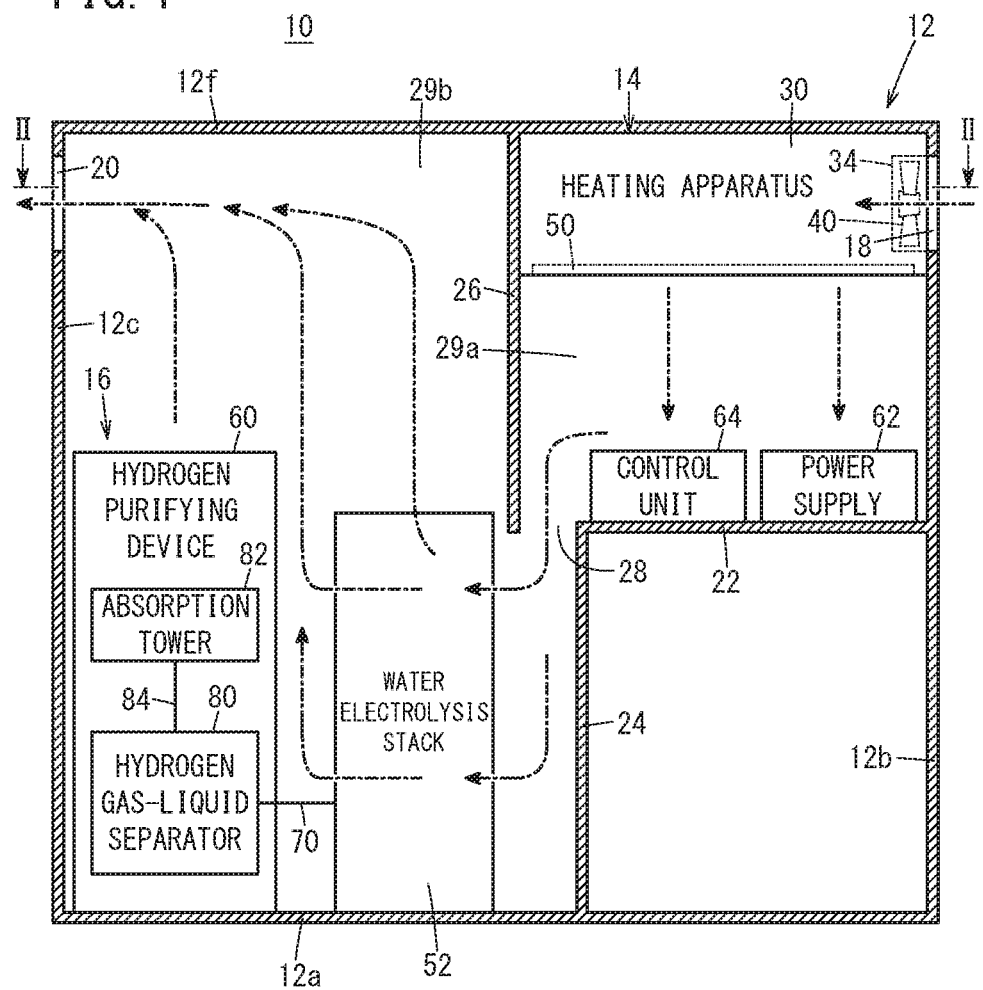
FIG. 1 is a schematic cross-sectional view of a water electrolysis system with a heating apparatus according to an embodiment of the present invention.

As shown in FIG. 1, a water electrolysis system 10 according to an embodiment of the present invention includes a casing 12, and a heating apparatus 14 and a water electrolysis device 16 accommodated in the casing 12.

Figure 2:
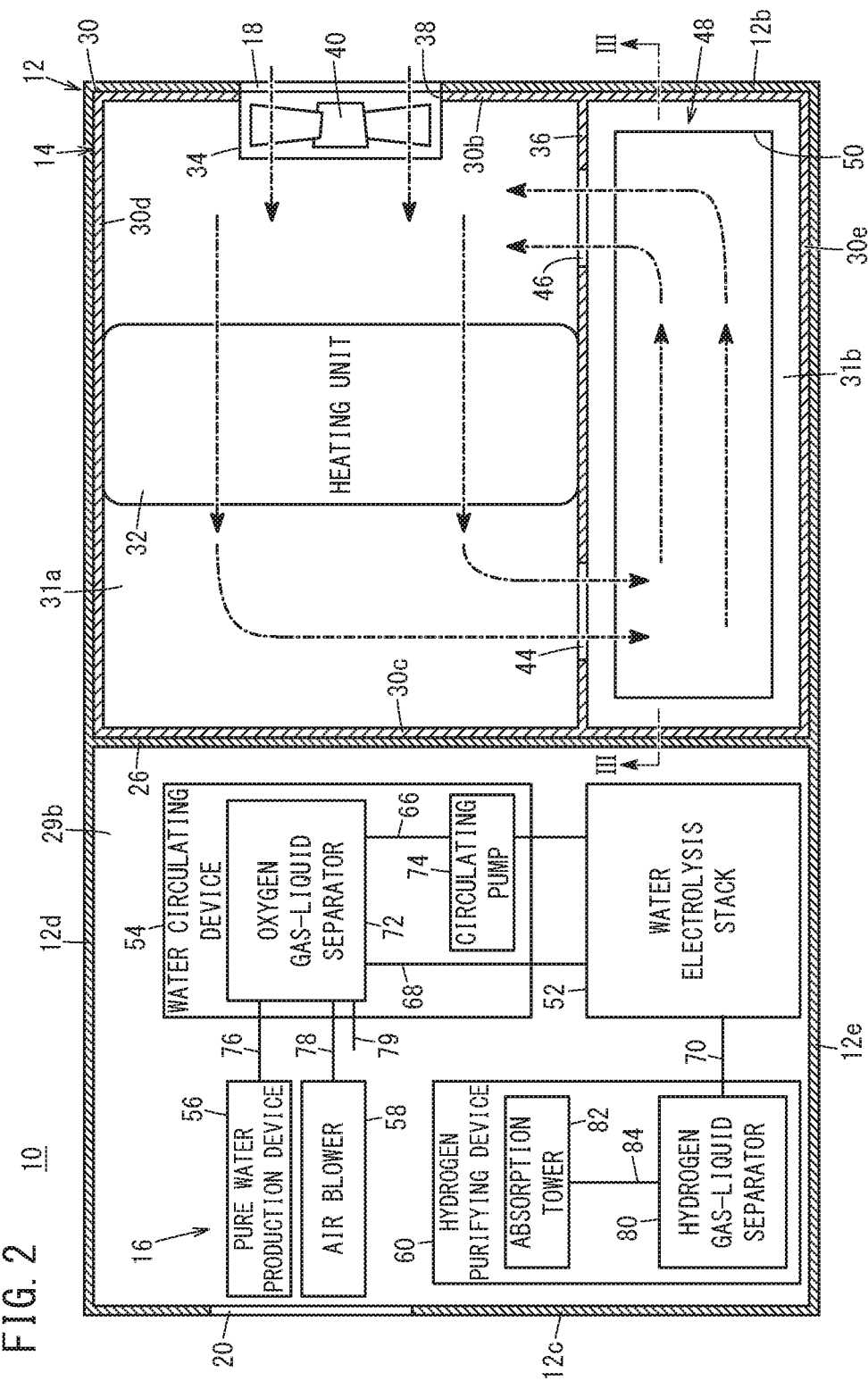
FIG. 2 is a schematic cross-sectional view taken along II-II line in FIG. 1.
Figure 3:
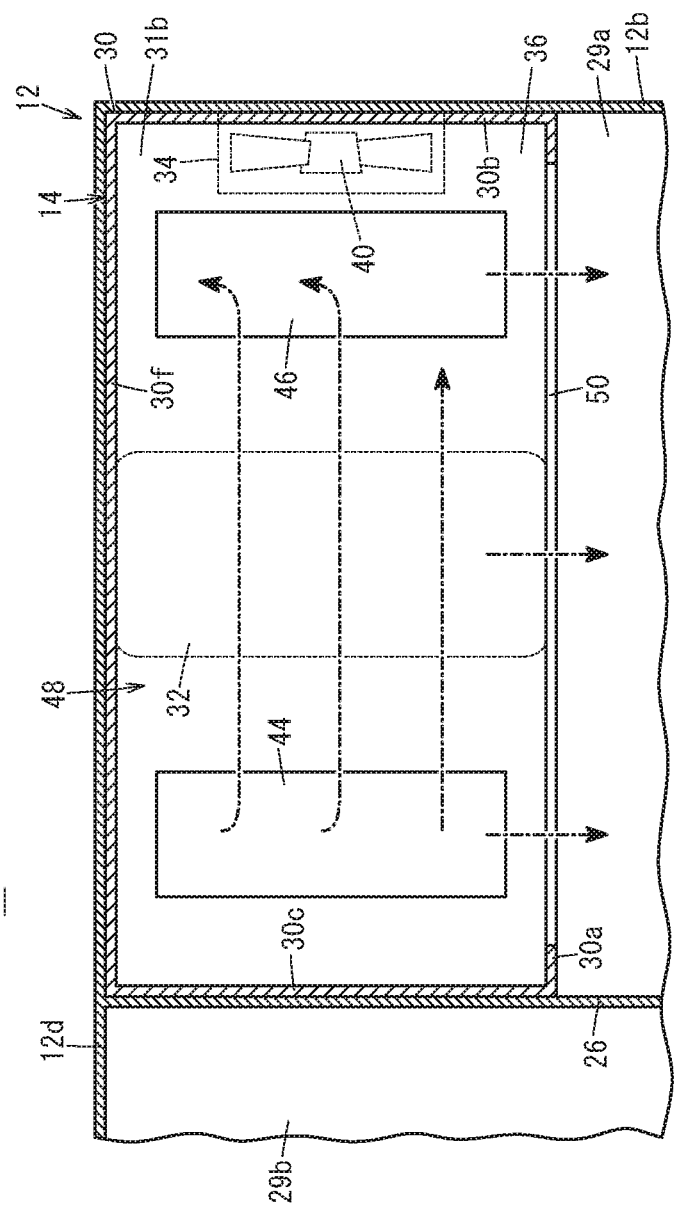
FIG. 3 is a schematic cross-sectional view taken along III-III line in FIG. 2 with some parts omitted.

As shown in FIGS. 1 to 3, the casing 12 is formed in the shape of a rectangular parallelepiped, having a bottom wall 12a, a first side wall 12b, a second side wall 12c, a third side wall 12d, a fourth side wall 12e, and an upper wall 12f. In an upper portion 30f of the first side wall 12b, an air inlet 18 for taking outside air (air) into the casing 12 is formed. In the upper portion 30f of the second side wall 12c opposite the first side wall 12b, an air outlet 20 for letting out the air in the casing 12 to the outside is formed.

In FIG. 1, a first supporting wall 22, a second supporting wall 24, and a guiding wall 26 are provided in the casing 12. The first supporting wall 22 projects from a vertically intermediate part of the first side wall 12b toward the second side wall 12c. The first supporting wall 22 extends substantially parallel with the bottom wall 12a and the upper wall 12f, and is coupled with the third side wall 12d and the fourth side wall 12e. The second supporting wall 24 couples the projecting end of the first supporting wall 22 and the bottom wall 12a to each other. The guiding wall 26 projects downward from the upper wall 12f.

The guiding wall 26 is for guiding the air led from the heating apparatus 14 downward. The guiding wall 26 extends substantially parallel with the first side wall 12b and the second side wall 12c, and is coupled with the third side wall 12d and the fourth side wall 12e. However, the guiding wall 26 may also be inclined relative to the first side wall 12b and the second side wall 12c. The air outlet 20 and the air inlet 18 are located on opposite sides of the guiding wall 26.

The interval between the guiding wall 26 and the first side wall 12b is approximately equal to the interval between the guiding wall 26 and the second side wall 12c. The projecting end of the guiding wall 26 is located at substantially the same height as the first supporting wall 22. A passage 28 (a gap) is formed between the projecting end of the guiding wall 26 and the projecting end of the first supporting wall 22.

In the casing 12, a first housing space 29a and a second housing space 29b are provided. The first housing space 29a is a space formed by the first supporting wall 22, the guiding wall 26, the first side wall 12b, the third side wall 12d, the fourth side wall 12e, and the upper wall 12f. That is, the first housing space 29a is a space on the side where the air inlet 18 is present. The second housing space 29b is a space in the casing 12 except the first housing space 29a. In other words, the second housing space 29b is a space formed by the bottom wall 12a, the second supporting wall 24, the guiding wall 26, the second side wall 12c, the third side wall 12d, the fourth side wall 12e, and the upper wall 12f. That is, the second housing space 29b is a space on the side where the air outlet 20 is present.

The heating apparatus 14 is positioned in the first housing space 29a so as to face the air inlet 18. The heating apparatus 14 is for heating the outside air taken into the casing 12.

Figure 4:
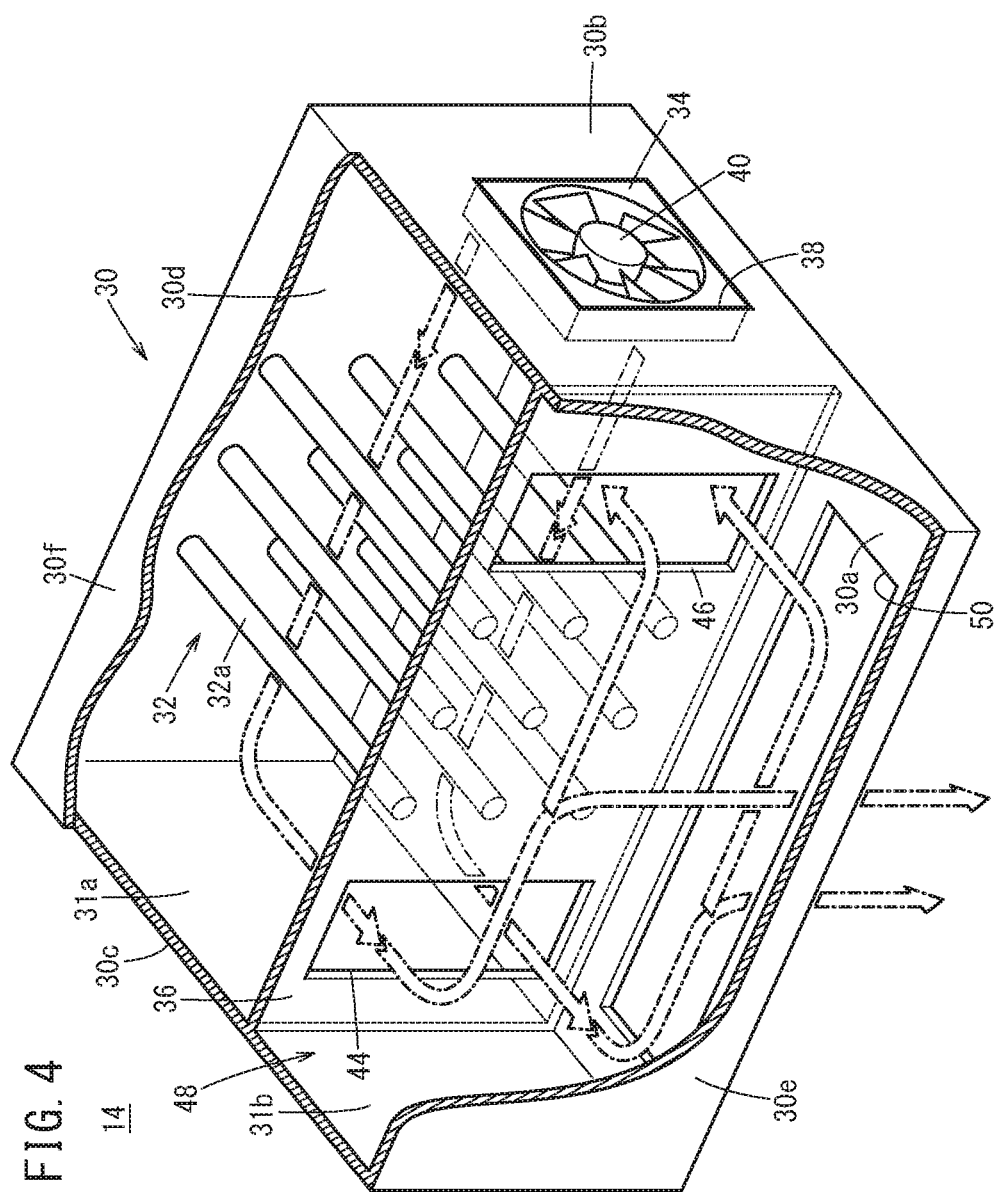
FIG. 4 is a partially cut away perspective view of the heating apparatus shown in FIG. 1.

As shown in FIGS. 2 to 4, the heating apparatus 14 includes an enclosure 30, and a heating unit 32 and a blowing unit 34 disposed in the enclosure 30. The enclosure 30 is formed in the shape of a box, having a bottom portion 30a, a first side portion 30b, a second side portion 30c, a third side portion 30d, a fourth side portion 30e, and an upper portion 30f. The first side portion 30b faces the first side wall 12b, the second side portion 30c faces the guiding wall 26, the third side portion 30d faces the third side wall 12d, and the fourth side portion 30e faces the fourth side wall 12e.

The enclosure 30 is provided with a partition wall 36, which segments the inside of the enclosure 30 into a first chamber 31a and a second chamber 31b. The partition wall 36 extends substantially parallel with the third side portion 30d and the fourth side portion 30e. However, the partition wall 36 may be inclined relative to the third side portion 30d and the fourth side portion 30e. The interval between the partition wall 36 and the third side portion 30d (the width dimension of the first chamber 31a) is larger than the interval between the partition wall 36 and the fourth side portion 30e (the width dimension of the second chamber 31b). The first chamber 31a and the second chamber 31b lie adjacent to each other in the horizontal direction.

In the first chamber 31a, the heating unit 32 for heating air is positioned. As shown in FIG. 4, the heating unit 32 is embodied as a so-called sheathed heater, composed of nichrome wires disposed in heater pipes 32a. A number of heater pipes 32a are provided in the vertical direction as well as in the direction of flow of air (the direction from the first side portion 30b toward the second side portion 30c). Each heater pipe 32a extends from the third side portion 30d to the partition wall 36. In other words, each heater pipe 32a extends in the direction orthogonal to the direction of flow of air. However, the heating unit 32 may be anything that can heat air. The heating unit 32 is apart from the first side portion 30b and the second side portion 30c.

In FIGS. 2 and 4, a draw-in hole 38 for introducing outside air into the first chamber 31a is formed in the first side portion 30b. The draw-in hole 38 is in communication with the air inlet 18. In the draw-in hole 38, the blowing unit 34 for directing air to the heating unit 32 is positioned. The blowing unit 34 is embodied as an axial flow fan and has an impeller 40. The heating unit 32 is located on the axis of the impeller 40. In other words, the impeller 40 faces the heating unit 32.

As shown in FIGS. 2 to 4, the partition wall 36 has a first communication hole 44 and a second communication hole 46 formed therein. The first communication hole 44 is a hole for directing part of the air heated by the heating unit 32 into the second chamber 31b. The first communication hole 44 is located more toward the second side portion 30c than the heating unit 32 (opposite the blowing unit 34). The first communication hole 44 is formed in a rectangular shape. The first communication hole 44 extends from near the bottom portion 30a to near the upper portion 30f in the vertical direction (the direction orthogonal to the direction of alignment of the blowing unit 34 and the heating unit 32).

The second communication hole 46 is a hole for directing the air in the second chamber 31b to a space between the heating unit 32 and the blowing unit 34. The second communication hole 46 is located more toward the first side portion 30b (more toward the blowing unit 34) than the heating unit 32. The second communication hole 46 is formed in a rectangular shape. The second communication hole 46 extends from near the bottom portion 30a to near the upper portion 30f in the vertical direction (the direction orthogonal to the direction of alignment of the blowing unit 34 and the heating unit 32). The opening area of the second communication hole 46 is substantially the same as the opening area of the first communication hole 44. The first communication hole 44 and the second communication hole 46 lie side by side along the direction of alignment of the blowing unit 34 and the heating unit 32 (the horizontal direction). The first communication hole 44, the second chamber 31b, and the second communication hole 46 define a circulation channel 48, which directs the air heated by the heating unit 32 to a space between the heating unit 32 and the blowing unit 34.

In the bottom portion 30a (the bottom surface defining the second chamber 31b), a draw-out hole 50 (draw-out portion) is formed for leading, in the second chamber 31b, the remaining air (the air heated by the heating unit 32) that has not been introduced into the second communication hole 46 to the outside. That is, the draw-out hole 50 leads part of the air flowing in the circulation channel 48 to the outside. The draw-out hole 50 is in communication with the first housing space 29a of the casing 12. The draw-out hole 50 is formed in a rectangular shape. The draw-out hole 50 extends from near the first side portion 30b to near the second side portion 30c. That is, the draw-out hole 50 extends along the direction of alignment of the first communication hole 44 and the second communication hole 46. The opening area of the draw-out hole 50 is larger than each of the opening areas of the first communication hole 44 and the second communication hole 46.

As shown in FIGS. 1 and 2, the water electrolysis device 16 is positioned in the casing 12 such that air heated by the heating apparatus 14 is directed to the water electrolysis device 16. The water electrolysis device 16 has a water electrolysis stack 52, a water circulating device 54, a pure water production device 56, an air blower 58, a hydrogen purifying device 60, a power supply 62, and a control unit 64.

Specifically, in FIG. 1, the power supply 62 and the control unit 64 are positioned in the first housing space 29a.

The power supply 62 and the control unit 64 are located on the upper surface of the first supporting wall 22 so as to be situated under the draw-out hole 50.

The water electrolysis stack 52, the water circulating device 54, the pure water production device 56, the air blower 58, and the hydrogen purifying device 60 are positioned in the second housing space 29b. The water electrolysis stack 52 is located more toward the second side wall 12c (more toward the air outlet 20) than the guiding wall 26. That is, the water electrolysis stack 52 is positioned downstream of the control unit 64 in terms of air flow within the casing 12. The air outlet 20 is located above the water electrolysis stack 52 and the hydrogen purifying device 60.

The water electrolysis stack 52 produces oxygen and high-pressure hydrogen (hydrogen with a pressure higher than normal pressure) by electrolysis of water (pure water). Although not shown, the water electrolysis stack 52 is composed of stacked unit cells. Each unit cell has a membrane-electrode assembly and an anode-side separator and a cathode-side separator that hold the membrane-electrode assembly in between. The membrane-electrode assembly includes, for example, a solid polymer electrolyte membrane formed of a film of perfluorosulfonic acid impregnated with water and an anode-side power feeder and a cathode-side power feeder provided on the opposite surfaces of the solid polymer electrolyte membrane.

The water electrolysis stack 52 is connected with a water supply line 66, a water discharge line 68, and a hydrogen draw-out line 70. The water supply line 66 supplies water to the water electrolysis stack 52. The water discharge line 68 discharges unreacted water, oxygen generated by reaction, and hydrogen that has permeated through from the water electrolysis stack 52. The hydrogen draw-out line 70 leads hydrogen generated by reaction out of the water electrolysis stack 52.

In FIG. 2, the water circulating device 54 has an oxygen gas-liquid separator 72 and a circulating pump 74. The oxygen gas-liquid separator 72 separates oxygen and hydrogen from the water discharged from the water electrolysis stack 52 and stores the water. The circulating pump 74 supplies the water stored in the oxygen gas-liquid separator 72 to the water electrolysis stack 52 and is provided in the water supply line 66.

The oxygen gas-liquid separator 72 is connected with a pure water supply line 76 connected with the pure water production device 56, and a gas discharge line 79 for discharging the oxygen and hydrogen separated from water in the oxygen gas-liquid separator 72.

The pure water production device 56 is connected with the pure water supply line 76 and supplies pure water generated from once treated water to the oxygen gas-liquid separator 72. The air blower 58 is connected with the oxygen gas-liquid separator 72 through an air draw-in line 78 and discharges gas components separated by the oxygen gas-liquid separator 72 (oxygen and hydrogen) from the gas discharge line 79 in a diluted state.

As shown in FIGS. 1 and 2, the hydrogen purifying device 60 has a hydrogen gas-liquid separator 80 and an absorption tower 82. The hydrogen gas-liquid separator 80 is connected with the hydrogen draw-out line 70, and separates moisture from the hydrogen discharged from the water electrolysis stack 52 and stores the separated water. The absorption tower 82 is connected with the hydrogen gas-liquid separator 80 through a hydrogen line 84 and absorbs water vapor (moisture) contained in the hydrogen guided from the hydrogen gas-liquid separator 80.

The power supply 62 applies DC voltage to the water electrolysis stack 52. The control unit 64 controls the entire operation of the water electrolysis device 16, controlling the electric components of the water electrolysis device 16.

The water electrolysis system 10 configured as described above operates as follows, where it is assumed that the water electrolysis system 10 is installed in the cold region. The water electrolysis system 10 may however be installed in a region other than the cold region.

When the water electrolysis device 16 is to be activated, the heating unit 32 and the blowing unit 34 are driven. That is, the temperature of the heating unit 32 is increased and the impeller 40 of the blowing unit 34 is rotated. As a result, the blowing unit 34 causes the outside air (low-temperature air) taken in the casing 12 from the air inlet 18 to flow into the first chamber 31a and be blown toward the heating unit 32, as shown in FIG. 2. Then, the air heated by the heating unit 32 is introduced into the second chamber 31b via the first communication hole 44.

In the first chamber 31a, since the flow rate of air is increased (the pressure decreases) between the heating unit 32 and the blowing unit 34 (the downstream side of the blowing unit 34), the air in the second chamber 31b flows between the heating unit 32 and the blowing unit 34 in the first chamber 31a via the second communication hole 46 due to the Venturi effect. That is, the air heated by the heating unit 32 is introduced between the heating unit 32 and the blowing unit 34 through the circulation channel 48 (the first communication hole 44, the second chamber 31b, and the second communication hole 46). In this way, air can effectively be heated while maintaining the flow rate required for ventilation in the casing 12.

As shown in FIG. 3, air sufficiently heated by the heating unit 32 spreads throughout the second chamber 31b and is led downward to the first housing space 29a from the draw-out hole 50 in the bottom portion 30a. After being led downward from the heating apparatus 14, the air (warm air) is then guided down by the guiding wall 26 to warm the control unit 64 and the power supply 62 as shown in FIG. 1. The warm air in the first housing space 29a flows into the second housing space 29b through the passage 28.

After entering the second housing space 29b from the passage 28, the warm air warms the water electrolysis stack 52, the hydrogen purifying device 60, the water circulating device 54, the air blower 58, and the pure water production device 56, and then flows to the outside from the air outlet 20.

When the water electrolysis device 16 is activated, pure water generated from once treated water via the pure water production device 56 is supplied to the oxygen gas-liquid separator 72 through the pure water supply line 76. Then, under the action of the circulating pump 74, the pure water in the oxygen gas-liquid separator 72 is supplied to the anode entrance side of the water electrolysis stack 52 through the water supply line 66. Meanwhile, a voltage is applied to the water electrolysis device 16 by the power supply 62 so that current flows therethrough.

Consequently, on the anode side of the unit cells of the water electrolysis stack 52, the pure water is electrolyzed to generate hydrogen ions, electrons, and oxygen. On the cathode side of the unit cells, the hydrogen ions bind to the electrons, producing hydrogen.

At the anode-side exit of the water electrolysis stack 52, oxygen generated by reaction, unreacted water, and hydrogen that has permeated through flow, and a mixed fluid of the oxygen, the unreacted water, and the hydrogen is introduced into the oxygen gas-liquid separator 72 through the water discharge line 68. In the oxygen gas-liquid separator 72, the mixed fluid is separated into gas (oxygen and hydrogen) and liquid (water). The water separated by the oxygen gas-liquid separator 72 is introduced into the water electrolysis stack 52 through the water supply line 66 via the circulating pump 74. The oxygen and hydrogen separated by the oxygen gas-liquid separator 72 are discharged to the outside through the gas discharge line 79 while being diluted by the air blower 58.

At the cathode-side exit of the water electrolysis stack 52, hydrogen generated by reaction flows and this hydrogen is introduced into the hydrogen gas-liquid separator 80 through the hydrogen draw-out line 70. In the hydrogen gas-liquid separator 80, liquid water contained in the hydrogen is separated from the hydrogen and stored. The hydrogen separated by the hydrogen gas-liquid separator 80 is introduced into the absorption tower 82 through the hydrogen line 84 and dehumidified into dry hydrogen (product hydrogen). The dry hydrogen is supplied to a fuel cell electric vehicle, for example.

In the present example, the heating apparatus 14 and the water electrolysis system 10 according to this embodiment provides the following effects.

The heating apparatus 14 includes the enclosure 30 with the draw-in hole 38, the heating unit 32 accommodated in the enclosure 30 and heating outside air introduced into the enclosure 30 from the draw-in hole 38, the blowing unit 34 for directing outside air to the heating unit 32, the circulation channel 48 for directing part of air heated by the heating unit 32 to a space between the heating unit 32 and the blowing unit 34, and the draw-out hole 50 (draw-out portion) for leading the air heated by the heating unit 32 to the outside. Air in the circulation channel 48 is introduced to a space between the heating unit 32 and the blowing unit 34 due to the Venturi effect.

As a result, the outside air blown from the blowing unit 34 to the heating unit 32 is heated by the heating unit 32, and then it flows down the circulation channel 48 to be introduced more toward the blowing unit 34 than the heating unit 32 due to the Venturi effect and reheated by the heating unit 32. Thus, outside air can be reliably heated with a required air velocity (an air velocity required for ventilation of the casing 12) secured, while an increase in the power consumption of the heating apparatus 14 and in its size is avoided.

The draw-out hole 50 leads part of air flowing in the circulation channel 48 to the outside. Therefore, the heating apparatus 14 can be made compact.

The enclosure 30 is provided with the partition wall 36 which segments the inside of the enclosure 30 into the first chamber 31*a* and the second chamber 31*b*. The partition wall 36 has formed therein the first communication hole 44 for directing air that is present on the opposite side of the blowing unit 34 with respect to the heating unit 32 in the first chamber 31*a* into the second chamber 31*b*, and the second communication hole 46 for directing the air in the second chamber 31*b* to a space between the heating unit 32 and the blowing unit 34. The circulation channel 48 includes the first communication hole 44, the second chamber 31*b*, and the second communication hole 46. This allows the circulation channel 48 to be of a simple structure.

The first chamber 31*a* and the second chamber 31*b* lie adjacent to each other in the horizontal direction. Thus, the air heated by the heating unit 32 can be efficiently circulated in the first chamber 31*a* via the first communication hole 44, the second chamber 31*b*, and the second communication hole 46.

The second communication hole 46 extends in the direction orthogonal to the direction of alignment of the blowing unit 34 and the heating unit 32. This allows the second communication hole 46 to have a relatively large opening area while an increase in the size of the enclosure 30 in the direction of alignment of the blowing unit 34 and the heating unit 32 is avoided.

The draw-out hole 50 is provided in the bottom portion 30*a* of the enclosure 30. As a result, the air heated by the heating unit 32 flows high in the enclosure 30, so that air that has been sufficiently heated (warm air) can be led outside the enclosure 30 from the draw-out hole 50 without inhibiting the circulation of heated air.

Since the draw-out hole 50 is formed in the bottom surface defining the second chamber 31*b*, air flowing in the circulation channel 48 can be led out of the draw-out hole 50.

The opening area of the draw-out hole 50 is larger than the opening area of the second communication hole 46. Thus, the air heated by the heating unit 32 can be efficiently led out of the draw-out hole 50.

The water electrolysis system 10 includes the casing 12 accommodating the water electrolysis device 16 and the heating apparatus 14, and the water electrolysis device 16 is positioned in the casing 12 such that air heated by the heating apparatus 14 (warm air) is directed to the water electrolysis device 16. Thus, freezing of the water electrolysis device 16 can be suppressed with the air heated by the heating apparatus 14 even when the water electrolysis system 10 is installed in the cold region, and the inside of the casing 12 can be efficiently ventilated as well.

The water electrolysis device 16 has the water electrolysis stack 52 and the control unit 64 that controls the electric components of the water electrolysis device 16. The water electrolysis stack 52 is positioned downstream of the control unit 64 in terms of air flow within the casing 12. The control unit 64 is positioned below the draw-out hole 50 of the heating apparatus 14.

In this way, the control unit 64 and the water electrolysis stack 52 can efficiently be warmed by the air heated by the heating apparatus 14. In addition, even if hydrogen leaks from the water electrolysis stack 52, the leaking hydrogen (leaked hydrogen) can be prevented from being directed to the control unit 64 or the heating apparatus 14.

The casing 12 is provided with the air inlet 18, the guiding wall 26 for guiding air led from the draw-out hole 50 of the heating apparatus 14 downward, and the air outlet 20 located on the opposite side of the guiding wall 26 with respect to the air inlet 18. The control unit 64 is located more toward the air inlet 18 than the guiding wall 26 is, and the water electrolysis stack 52 is located more toward the air outlet 20 than the guiding wall 26 is.

In this way, the air heated by the heating apparatus 14 can be efficiently directed to the control unit 64 by the guiding wall 26. In addition, the leaked hydrogen can be reliably kept from being directed to the control unit 64 or the heating apparatus 14 by the guiding wall 26, so that the leaked hydrogen can be readily discharged from the air outlet 20 with air.

The air outlet 20 is located above the water electrolysis stack 52. Thus, leaked hydrogen can be efficiently discharged from the air outlet 20.

The present invention is not limited to the above embodiment. The partition wall 36 may be provided so as to segment the inside of the enclosure 30 into the first chamber 31*a* and the second chamber 31*b* in the vertical direction. The draw-out hole 50 may be provided on the side opposite the blowing unit 34 further from the blowing unit 34 than the heating unit 32 on the bottom surface defining the first chamber 31a. The draw-out hole 50 may be provided in any one or more of the first side portion 30b, the second side portion 30c, the third side portion 30d, and the fourth side portion 30e. In this case, a gap is provided between the side wall in which the draw-out hole 50 is provided and the casing 12.

The circulation channel 48 may be embodied as piping. The second communication hole 46 may be larger or smaller than the first communication hole 44. The blowing unit 34 may be disposed on the outer side of the enclosure 30 (a position facing the draw-in hole 38).

The guiding wall 26 may extend below the first supporting wall 22. In this case, the leaked hydrogen can be prevented from being directed to the control unit 64 and the power supply 62 more reliably.

As will be apparent, the heating apparatus and the water electrolysis system according to the present invention is not limited to the above embodiment, but may employ various other configurations without departing from the scope of the present invention.

What is claimed is:

1. A heating apparatus comprising:
an enclosure with a draw-in hole;
a heating unit accommodated in the enclosure and heating outside air introduced into the enclosure from the draw-in hole;
a fan as a blowing unit for blowing outside air to the heating unit;
a circulation channel for directing part of air heated by the heating unit to a space between the heating unit and the blowing unit; and
a draw-out portion for leading the air heated by the heating unit to outside, wherein
air in the circulation channel is introduced to the space between the heating unit and the blowing unit due to Venturi effect, wherein
the draw-out portion leads part of air flowing in the circulation channel to the outside,
the enclosure is provided with a partition wall which segments an inside of the enclosure into a first chamber and a second chamber,
the heating unit is positioned in the first chamber,
the draw-in hole introduces outside air into the first chamber,
the partition wall has formed therein
a first communication hole for directing into the second chamber air that is present further from the blowing unit than the heating unit in the first chamber, and
a second communication hole for directing air in the second chamber to the space between the heating unit and the blowing unit,
the circulation channel includes the first communication hole, the second chamber, and the second communication hole, and
the fan rotates to increase a flow rate of the air in the space between the heating unit in the first chamber and the blowing unit in order to achieve the Venturi effect.

2. The heating apparatus according to claim 1, wherein the first chamber and the second chamber lie adjacent to each other in a horizontal direction.

3. The heating apparatus according to claim 1, wherein the second communication hole extends in a direction orthogonal to a direction of alignment of the blowing unit and the heating unit.

4. The heating apparatus according to claim 1, wherein the draw-out portion is provided in a bottom portion of the enclosure.

5. The heating apparatus according to claim 4, wherein the draw-out portion is a hole formed in a bottom surface defining the second chamber.

6. The heating apparatus according to claim 5, wherein an opening area of the draw-out portion is larger than an opening area of the second communication hole.

7. The heating apparatus according to claim 1, wherein the first communication hole extends in a direction orthogonal to a direction of alignment of the blowing unit and the heating unit.

8. The heating apparatus according to claim 1, wherein an opening area of the second communication hole is substantially same as an opening area of the first communication hole.

9. The heating apparatus according to claim 1, wherein
the first communication hole and the second communication hole lie side by side along a direction of alignment of the blowing unit and the heating unit, and
the draw-out portion extends along a direction of alignment of the first communication hole and the second communication hole.

10. A water electrolysis system comprising:
a water electrolysis device that produces hydrogen by electrolysis of water;
a heating apparatus comprising:
an enclosure with a draw-in hole;
a heating unit accommodated in the enclosure and heating outside air introduced into the enclosure from the draw-in hole;
a fan as a blowing unit for blowing outside air to the heating unit;
a circulation channel for directing part of air heated by the heating unit to a space between the heating unit and the blowing unit; and
a draw-out portion for leading the air heated by the heating unit to outside, wherein
air in the circulation channel is introduced to the space between the heating unit and the blowing unit due to Venturi effect; and
a casing accommodating the water electrolysis device and the heating apparatus, wherein
the water electrolysis device is positioned in the casing such that the air heated by the heating apparatus is directed to the water electrolysis device,
the draw-out portion leads part of air flowing in the circulation channel to the outside,
the enclosure is provided with a partition wall which segments an inside of the enclosure into a first chamber and a second chamber,
the heating unit is positioned in the first chamber,
the draw-in hole introduces outside air into the first chamber,
the partition wall has formed therein
a first communication hole for directing into the second chamber air that is present further from the blowing unit than the heating unit in the first chamber, and
a second communication hole for directing air in the second chamber to the space between the heating unit and the blowing unit,
the circulation channel includes the first communication hole, the second chamber, and the second communication hole, and the fan rotates to increase a flow rate of the air in the space between the heating unit in the first chamber and the blowing unit in order to achieve the Venturi effect.

11. The water electrolysis system according to claim 10, wherein the water electrolysis device has
a water electrolysis stack, and
a control unit that controls electric components of the water electrolysis device,
the water electrolysis stack is positioned downstream of the control unit in terms of air flow within the casing, and
the control unit is positioned below the draw-out portion of the heating apparatus.

12. The water electrolysis system according to claim 11, wherein the casing is provided with
an air inlet for taking air into the casing,
a guiding wall projecting downward from a position at which the heating apparatus is disposed, for guiding air led from the drawout portion of the heating apparatus downward, and
an air outlet and the air inlet being located on opposites side of the guiding wall, and the air outlet letting out air in the casing to outside,
the control unit is located more toward the air inlet than the guiding wall is, and
the water electrolysis stack is located more toward the air outlet than the guiding wall is.

13. The water electrolysis system according to claim 12, wherein the air outlet is located above the water electrolysis stack.

* * * * *